United States Patent [19]

Subramanian

[11] Patent Number: 5,269,336
[45] Date of Patent: Dec. 14, 1993

[54] AIR VENTILE FOR PRESSURE COOKERS AND PRESSURE COOKERS HAVING THE SAME

[75] Inventor: Naranammalpuram S. Subramanian, Bombay, India

[73] Assignee: Hawkins Cookers Limited, Maharashtra, India

[21] Appl. No.: 991,645

[22] Filed: Dec. 16, 1992

[51] Int. Cl.$^5$ .................. F16K 17/28; F16K 17/38
[52] U.S. Cl. .................................... 137/73; 137/74; 220/89.4; 220/203
[58] Field of Search .................... 137/72, 73, 74, 519; 220/203, 89.4

[56] References Cited

U.S. PATENT DOCUMENTS

| | | | |
|---|---|---|---|
| 1,093,576 | 4/1914 | McNutt | 137/73 |
| 2,188,735 | 1/1940 | Grundstrom | 220/89.4 X |
| 2,357,620 | 9/1944 | Thomas | 137/73 X |
| 2,580,340 | 12/1951 | Zimmer et al. | 220/89.4 X |
| 2,619,982 | 12/1952 | Turner | 220/203 X |
| 2,908,288 | 10/1959 | Carr et al. | 137/73 X |
| 4,059,125 | 11/1977 | Sugimura et al. | 137/73 |
| 4,143,787 | 3/1979 | Walker | 220/203 |
| 4,162,741 | 7/1979 | Walker et al. | 220/203 |
| 4,796,776 | 1/1989 | Dalquist et al. | 220/203 |
| 5,135,121 | 8/1992 | Javier | 220/203 |

Primary Examiner—John Rivell
Attorney, Agent, or Firm—Kerkam, Stowell, Kondracki & Clarke

[57] ABSTRACT

There is provided a novel dual functioning, dual metal safety release valve for a pressure cooker. This valve comprises a metallic retainer member having a bore therein in which is held a fusible metal alloy. The metallic retainer is held in a suspended manner loosely in an opening in the lid of the pressure cooker contrary to the conventional manner in which the said release valve is sealingly fitted to the pressure cooker. The safety release valve is held at a specific angle and is so fabricated that when the pressure cooker is in operation, the safety release valve remains in suspended condition in the opening of the lid of the cooker, thereby letting air to escape first and when substantially all the air has escaped, the developing steam pressure forces the safety release valve upwards and a sealing of the opening in the lid of the cooker is achieved.

8 Claims, 2 Drawing Sheets

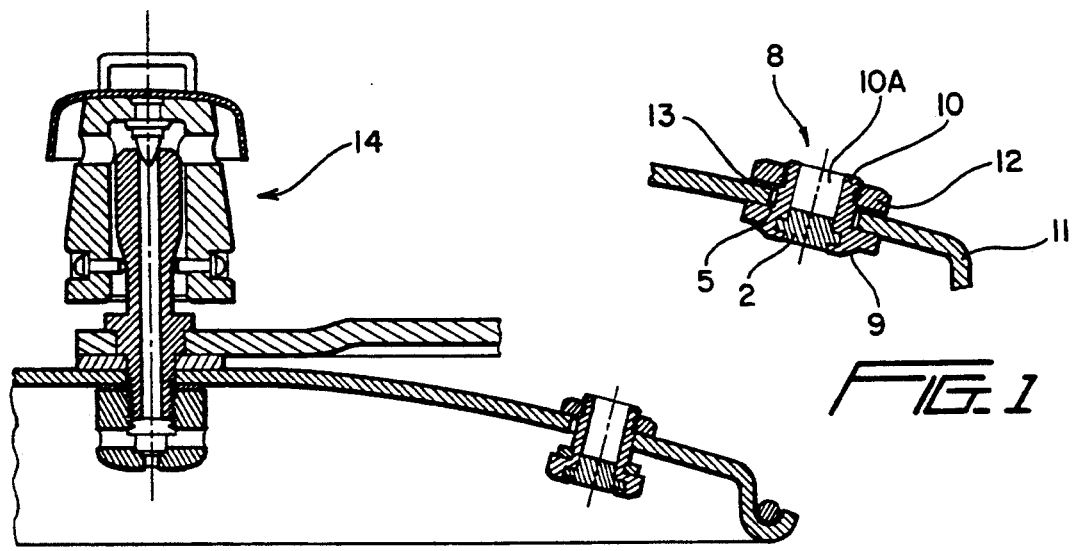
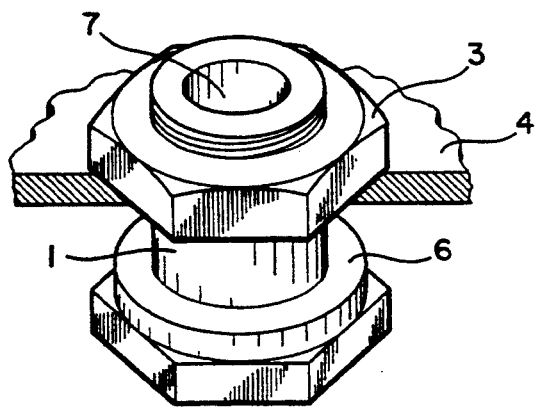
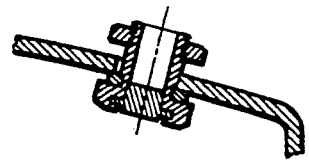
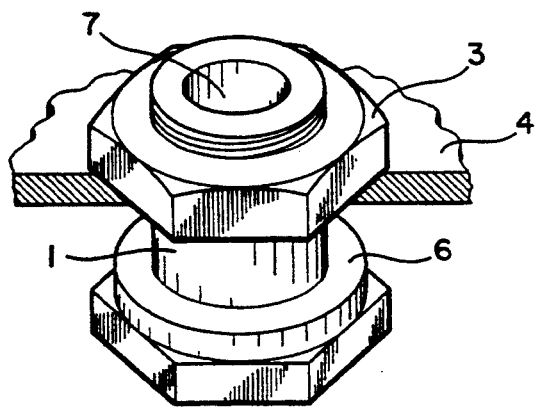
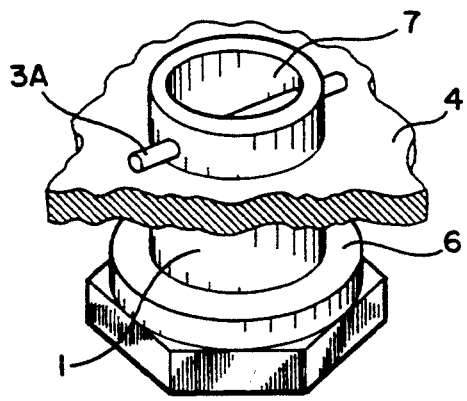
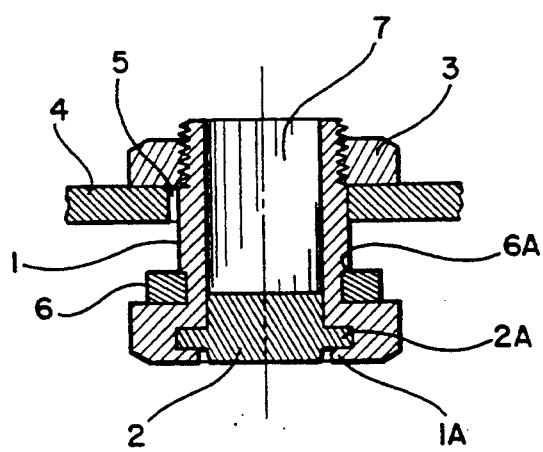

AIR VENTILE FOR PRESSURE COOKERS AND PRESSURE COOKERS HAVING THE SAME

This invention relates to a novel dual function, dual metal, thermally fusible type, Safety Release Valve for use in domestic pressure cookers.

Domestic pressure cookers are usually provided with two different Safety Release Valves, performing two distinct functions.

The two valves referred above, are the Primary Release Valve and the Secondary Release Valve. The Primary Release Valve is usually a dead weight type of valve, closing an orifice by means of a conical pin, engaging the orifice. The dead weight determines the normal cooking pressure which is usually 15 lbs per sq. in. When heat is applied to the pressure cooker, steam pressure builds up to the cooking pressure, and thereafter with further application of heat, steam is let out into the atmosphere, by the lifting of the dead weight of the Primary Release Valve.

Thus, at no time the pressure cooker is expected to function beyond the normal cooking pressure. The dead weight of the Primary Release Valve is also referred to as Vent Weight, because it vents the excess steam.

It may be added here, that, after the attainment of cooking pressure, the heat application is reduced, so that, while the steam pressure is maintained, very little of steam is let out to the atmosphere. This is done to minimise the heat required for cooking. Application of more heat than required, merely results in generation of steam which is let out to the atmosphere and is not useful in the cooking process.

The Secondary Release Valve, is expected to work only in an emergency, when the Primary Release Valve has failed to function for some reason, for example, the food particles can clog the steam-release hole of the Primary Release Valve.

The Secondary Release Valves are usually of three types. In one type of Secondary Release Valve which is of the non-fusible repeat functioning type, the pressure exerted by a spring on the valve stem, controls the pressure of steam under conditions of emergency release.

In a second type of the Secondary Release Valve, it has a fusible low melting alloy, encased in a non-fusible metal retainer of good heat conducting material like aluminium. When the Primary Release Valve has failed to function, the steam pressure builds up to increasing value and the temperature of the steam also increases correspondingly; and, at a particular stage of steam pressure, the temperature is sufficiently high, so as to cause the melting of fusible metal alloy. The alloy melts, creates an opening in the lid, and through the opening, steam under excess pressure is safely let out. The fusible metal alloy safety valve has to be replaced by a new fusible Secondary Release Valve.

In the said known art of the second type, the Safety Release Valve is made up of two parts, viz. the safety fuse retainer and a holding nut. The safety fuse retainer is fastened to the lid of the pressure cooker by means of holding nut. The safety fuse retainer has at its centre, the low melting fusible alloy (FIG. 1). The retainer and the nut are usually made of aluminium, to pick up the temperature of the steam rapidly and transmit it to the fusible alloy faster. The safety fuse retainer and the nut are clamped tight to the lid so that steam cannot escape in any manner at the joint.

In the said third type of Secondary Release Valve, there are two parts made of two dissimilar materials, one metallic, another non-metallic. The metallic part is a "pintle" made of fusible low melting alloy. It is suspended from a hole in a thick rubber housing (the non-metallic material). The rubber housing is s lipped into a hole, (and held in position) on the lid of the pressure cooker. When excessive steam pressure builds up, the rubber housing ejects out of the lid, exposing an orifice in the lid and steam is allowed to escape. The fusible metal "pintle" has a head and conical bulbous portion connected by a narrow neck. The head prevents the "pintle" from falling into the cooker. When excess pressure builds up and the rubber has not ejected, the bulbous portion of the "pintle", ejects out of the hole in the rubber and steam releases. If the ejection of "pintle" also fails with further build up of pressure, the "neck" melts and steam releases.

The rubber and "pintle" fail to eject in time, and the system has been largely given up.

The Thermally Fusible Safety Type Secondary Release Valve is one of the most popular and widely used Valves and has proved itself over the years. Nevertheless, this type of Secondary Release Valve still offers scope for further improvement, as explained below:

At the commencement of cooking, the lid of the pressure cooker is closed, and heat is applied. The manufacturers of all pressure cookers advise the users to let out steam and air, through the orifice meant for the dead weight of the Primary Release Valve, for a while and then place the dead weight. The reasons for this instruction are two: By following the instruction, the user first ensures that the Primary Release orifice is clear and there is no danger of prior choking by food particles.

Secondly, when steam and air are released through the orifice prior to the placement of the dead weight, it carries with it most of the air which was present inside the pressure cooker when the lid was closed. If the manufacturers' instructions were not followed and the Vent Weight (the Dead Weight of the Primary Release Valve) had been placed from the time of turning on the heat, the following conditions would result.

With the application of heat, the temperature of water inside the pressure cooker gradually rises to 100° C. and beyond. The steam pressure, in the empty space inside the pressure cooker continues to build up. At the same time the pressure of the air inside the empty space also increases; thus at any point of time, for a given temperature inside the pressure cooker, the pressure would be the sum total of the steam pressure and the air pressure taken separately. If for any reason, the Primary Release Valve fails to function, the pressure and temperature of the steam would increase until the temperature sensitive fusible metal alloy of the Secondary Release Valve melts, and releases excess pressure. Since the fusible metal alloy is sensitive to steam temperature and not to its pressure, there is the liklihood of the cooker being subjected to higher pressures than expected, the excess pressure over the steam pressure being contributed by the individual pressure of air. Thus, the performance of the thermally fusible safety valve gets vitiated by the presence of air and the error can be as much as 10 psi, decreasing the factor of safety in mechanical strength, provided in the Design of the pressure cooker.

It is also known to have an independent air ventile fitted to the lid of a pressure cooker. This is in addition to the existing safety release valve. Thus the known art suggests two independent units each functioning independantly and achieving individual purposes. The air ventile is a simple pintle made of nonfusible material which lifts at and closes the air escape opening when some air and some steam has escaped. Thereafter, the safety release valve of any of the known three types discussed above comes into function with all the drawbacks attached to it. We have noticed that this independant air ventile is not effective to let out substantially all the air and only a part of the air is vented out. This is because the object in the prior art was to retain the flavour of the cooked food by exitting some air in the beginning before the actual cooking took place. The probable explanation can be that if air is not exitted in the beginning, then after the cooker has cooled and is opened, the trapped air escapes with the aromatics from the food items. If the air is even partly exitted, then the loss of aroma is limited and the prior art claims that the aroma is maintained.

There was no other objective of the air ventile system of the known art.

We have investigated and found, that unless substantially all the air is first exitted (with accompanying steam) there will be unnecessary build up of pressure due to the partial pressure of the trapped air which will affect the functioning of the safety release valve.

Because the objective was very limited in the known art, no consideration was given to any other aspects of the air ventile nor was there any consideration of the air ventile co-related with the pressure at which the safety release valve would operate.

In our investigations, it has been found that it is necessary to co-relate the function and construction of the air ventile and the safety release valve to exit almost all the air and then to immediately seal the vent and thereafter build up substantial steam pressure. For this, we had to dispense with independant units of air ventile and the safety release valve and device a single unit having both constructions and functions and give better advantages to us. We had to design a novel and new system itself co-relating the time to exit air, the clearance between the opening and the valve stem, the sealing pressure for air ventile, the lift of the air ventile as well as optimum weight of the integrated valve system.

Our approach gives an economical construction, as we have combined the functions of two independant units by designing a new unit unique in construction and function.

We have further found that our new system can be easily retrofitted in old pressure cookers in use, but having only Safety Release Valves and Primary Release Valves and thus giving even old pressure cookers the advantage of air vent and safety release.

It is therefore, an object of this invention which will ensure removal of all the air automatically without the necessity of the user venting the air as instructed by the manufacturers.

It is another object of this invention to propose a novel thermally fusible, dual metal, dual function, Safety Release Valve, which will have the dual functions of venting the air from the pressure cooker first and then function as an improved thermally fusible alloy of the Safety Release Valve, being sensitive only to steam temperature and unvitiated by air. It is a further object of this invention to propose such a dual function, dual metal, thermally fusible type, Safety Release Valve which can be used in a conventional pressure cooker without any change or without using any additional accessories.

It is still a further object of this invention, to propose such a thermally fusible, dual metal, dual function, Safety Release Valve, due to which the pressure regulating vent weight can be used even at the very beginning of cooking, without the user having to necesssarily vent the air.

These and other objects of this invention will be apparent from the following paragraphs.

Thus, according to this invention there is provided a novel dual functioning, dual metal, Safety Release Valve, which comprises a fusible metallic material held within the bore of a metallic retainer member, the stem of the said metallic retainer being adapted to be loosely and angularly held by a holding member, to an opening in the lid of the pressure cocker, the said stem also having a thin washer made of non-metallic resilient material adapted to seal under steam pressure, the opening in the lid of the pressure cooker, automatically, after substantially all the air is vented.

The fusible metallic material is made of conventional low temperature fusible metal alloys. The fusible material is held in the form of a plug at the lower end of the vertical bore in the metallic retainer member.

The holding member is adapted to be engaged externally to the lid of the pressure cooker on the protruding portion of the stem of the metallic retainer.

The lower body of the metallic retainer is provided with an undercut—cut portion externally adapted to provide a seat for the non-metallic resilient washer. The non-metallic resilient washer is made of nitrile rubber or other similar heat resilient elastic material.

The invention will now be more fully described with reference to the accompanying drawings.

FIG. 1 shows a conventional safety release valve.

FIG. 2 shows a cross - sectional view of the novel, dual function, dual metal, thermally fusible Safety Release Valve loosely held in a suspended maner to the lid of a pressure cooker onto which a conventional primary release valve is provided.

FIG. 3 shows in cross-section the novel, dual function, dual metal, thermally fusible Safety Valve in the operational condition in a pressure cooker.

FIG. 4 shows in perspective the novel, dual function, dual metal, thermally fusible Safety Release Valve and FIG. 4A shows, in perspective, a modified form of the safety release valve.

FIG. 5 shows further details of the Safety Release Valve of the invention.

Figure 7:
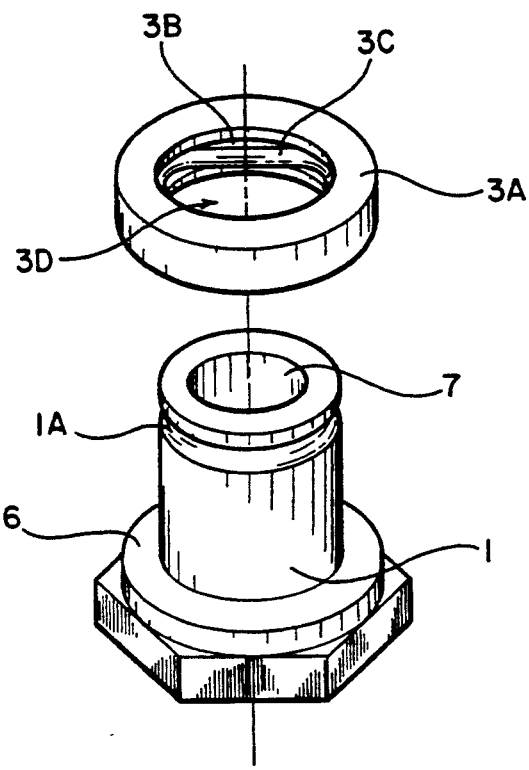
FIG. 7 shows another embodiment of the air ventile system in exploded view.

In FIG. 1, the conventional Safety Release Valve 8 is illustrated. The Safety Fuse comprises a fusible material 2 provided in the bore of a safety fuse retainer 10. The retainer 10 has an extended lower flange 9 accommodating the fusible material 2 within the bore 10A. The Safety fuse retainer is introduced from underside of the lid 11 through the hole 5 and is secured tightly to the lid by means of holding nut 12 using washer 13.

In FIG. 2, a cross section of part of the lid is shown carrying the conventional Primary Release Valve and the novel Safety Release Valve made of dual metal. In FIG. 2, the novel Safety Release Valve is shown in a suspended manner while in FIG. 3, the same fuse is shown in the working condition of the cooker under pressure.

Referring to FIGS. 2, 3, 4, 4A and 5, the novel dual function, dual metal, thermally fusible Safety Release Valve will be seen to consist of a hollow metal retainer I with a central vertical bore 7. At the lower end of the vertical bore, there is provided a temperature sensitive thermally fusible safety fuse 2 which is made of a conventional low temperature melting metal alloy. The fuse is held in the form of a plug having extension 2A held within a socket like provision 1A of the retainer 1.

The top end of the safety fuse metal retainer 1, is externally threaded to a limited extent so as to engage an internally threaded nut 3, such that the lower portion of the safety fuse retainer is loosely held in a suspended manner on the lid 4 of the pressure cooker through the hole 5 provided in the lid. It is also possible, to suspend the Safety fuse retainer by other means, such as by a cross—pin, 3A, FIG. 4A, instead of the nut. The lower end of the safety fuse retainer is provided with an under—cut portion 6A into which is securely held a washer 6 made of resilient material, such as, nitrile rubber or other similar heat resistant elastic material.

Figure 6:
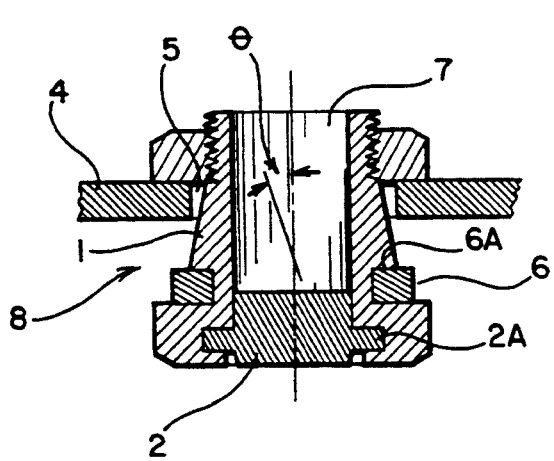
FIG. 6 shows a modified form of the Safety Release Valve.

As per modification shown in FIG. 6, the holding unit 1 is provided with a narrow taper 8 externally tapering towards the top leaving a clearance between the top of the taper and the hole in the lid in the free suspended condition. The seal is seated below the lower base of the taper in the under-cut 6A as before.

Due to this construction of tapered exterior surface, the stem will gradually close the opening during lift of the retainer and there will be uniform pressure balance. The clearance between the stem and the hole in the lid gets gradually decreased and the pressure build up is faster due to reduced gap for escape of stream as compared to a straight exterior stem.

Figure 8:
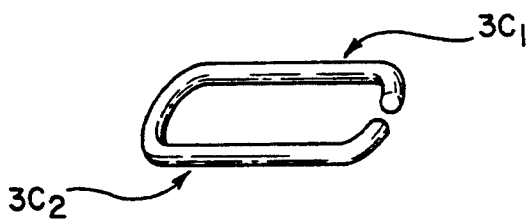
FIG. 8 shows a part of the air ventile shown in FIG. 7.

According to a modification, the air ventile is held to the hole in the lid of the cooker in a freely suspended manner by means of a holding sleeve—3A. , which replaces the holding nut 3. The sleeve is made specially for this purpose from a suitable flat metallic member having a central bore 3D whose diameter is slightly larger than the outer diameter of the stem of the air—ventile such that it can be slipped on the outer surface of the stem 1. The inner wall of the holding sleeve is provided with cylindrical groove 3B so as to accomodate a resilient clip 3C or holding spring 3C which has cut open ends as shown in FIG. 8. The distance between the inner edges of the clip is marginally less than the outer diameter of the stem. In view of the straight leg portions $3C_1$ and $3C_2$ of the clip which are separated by a distance less than the diameter of the groove, and also slightly less than the outer diameter of the stem of the spindle, these legs tend to expand when the stem is introduced between these legs and the stem can be slipped through. However, the outer surface of the stem is provided with a circular groove 1A whose diameter is about the same as the separating distance between the legs such that these legs snap into the groove and are held therein thereby arresting further insertion of the stem between the legs of the clip. For removing the stem it is necessary to hold to one edge of the sleeve and pull it to release from the clip with a slight pull, the clip is free of the stem.

For assembling the novel dual function, thermally fusible safety Release Valve of FIGS. 2 to 6, the holding nut 3 (or cross—pin ) is first removed and the top end of the Safety fuse retainer is introduced through the hole 5 of the lid from the underside of the lid. The safety fuse retainer already holds the safety fuse 2 and the resilient washer 6 in position at its lower end in the internal bore 7 and on the outside under-cut 6A respectively.

The holding nut is then threaded on to the upper end of the safety fuse retainer or the cross—pin is put in position in suitable aligned holes in the top of the stem. In view of the threading to the limited extent on the top portion of the safety fuse retainer, the safety fuse retainer is held floatingly and in a suspended manner in the hole of the lid.

Figure 9:
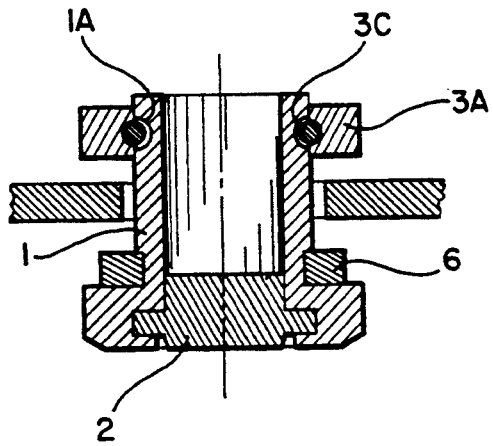
FIG. 9 shows a cross-sectional view of FIG. 7.

For assembling the novel dual function thermally fusible safety release valve of FIGS. 7, 8 and 9, the holding sleeve 3A is first removed by exerting a slight pulling pressure and the top end of the safety fuse retainer is introduced through the hole 5 of the lid from the underside of the lid. The safety fuse retainer already holds the safety fuse 2 and the resilient washer 6 in position at its lower end in the internal bore 7 and on the outside under-cut 6A respectively.

The holding sleeve is then placed on the top of the stem and gently pressed, preferably slightly slantingly. The top of the stem is located between the two legs. The holding sleeve gently slips through until the two legs $3C_1$, $3C_2$ of the clip engage the outer groove 7A on the stem. By suitably position the groove 7A, the air ventile will remain in a suspended state as the earlier one.

The external diameter of the safety fuse retainer is smaller to a predetermined degree than the diameter of the hole in the lid. This is to give an intended annular gap for the escape of steam and air.

The operation of the dual metal, dual function, Safety Release Valve of the present invention is as follows:

The Safety Valve is called a dual metal, dual function valve for the following reasons. Firstly the holding unit is made of a non - fusible metal like aluminium and in the central bore there is provided a fusible plug made of known fusible metal alloy.

Secondly, the Valve is intended to first let out substantially all the trapped air and some steam as a mixture in the initial stages in the suspended stage and then in the sealed stage function as the normal safety valve due to the melting of the alloy in the instance of excess pressure of steam and steam temperature.

Initially, the holding nut sits square on the external surface of the lid, on the slightly depressed and flattened portion of the hole in the lid. Due to the curvature of the lid, the Safety Release Valve assumes a dangling position, somewhat slanted to the vertical position.

When the lid of the pressure cooker is closed, and the dead weight of the Primary Release Valve has already been placed and heat is turned on, the temperature of water inside the pressure cooker gradually rises, say to about 80° to 90° C. Some steam is produced inside the pressure cooker and as the steam collects, it tends to increase the pressure above the atmospheric pressure. Then the steam and air start escaping through the annular gap around the Safety Release Valve. This causes slight lifting and tilting of the retainer, over the seal of the holding nut on the lid. A mixture of steam and air is then released, through the said annular gap, as the retainer and the holding nut are in a floating condition. Due to the escape of some steam and air, the pressure inside the cooker now drops back to a lower pressure.

The temperature of steam again rises and the mixture of steam and air is released. The cycle repeats.

After a temperature of 100° C. (Boiling point of water) is reached, the rate of generation of steam becomes faster and substantially all the air is displaced, by this time, through the annulus in the lid. But the annular gap between the hole and the stem of the retainer does not allow the steam to pass through at the same rate at which it is generated. Consequently, the steam pressure inside the cooker builds up. When this stage has been reached, within a short time, the steam pressure rises sufficiently to lift the retainer straight-up bodily, causing the gasket of the retainer to come into contact with the underside of the lid with pressure. The gasket seals the annular gap effectively and no more steam can now escape through the hole in the lid.

After this stage has been reached, steam pressure within the pressure cooker starts building up further, until the Primary Release Valve becomes operational. The proposed Safety Valve is now ready to function as a thermally fusible Safety Release Valve, in the event of an emergency.

In instances of emergency where the pressure inside the cooker exceeds the normal 15 psi due to any unexpected malfunction of the Primary Release Valve, the fusible material, i.e. the Safety fuse 2 (FIG. 5) gets overheated and melts in the normal manner, thereby opening the central bore 7 of the safety fuse retainer 1, thus enabling the safe exit of steam. Thus, in the initial stages, the Safety Release Valve, of this invention, functions as an air-venting valve and in the later stages of operation, it functions as a thermally fusible safety fuse. The dual functions are thus achieved by this dual metal valve. Thus, it will be seen that even if the Primary Release Valve is used, before all the air escapes from the cooker, the dual functioning, thermally fusible Safety Release Valve takes care of releasing the air automatically. It also enables the housewife to even set the cooker with the Primary Release Valve accommodated from the very begining, because of the automatic dual functions of the thermally fusible Safety Release Valve of the invention.

After continued research and experimental studies, it has been discovered by us, that for the satisfactory functioning of the thermally fusible Safety Release Valve of this invention, it is important to keep the annular clearance between the outer wall of the safety fuse retainer and the hole in the lid, within a pre-determined range of values. The ratio of diameter of hole to diameter of stem of the safety fuse retainer should be between 1.05 to 1.20. It has been further discovered by us that if the clearance is below the said pre-determined range, the hole is sealed prior to removal of all the air by venting and if the clearance is more than the pre-determined range, we run the risk of excess delay in sealing of the annular gap or the gap may never seal at all.

Another factor responsible for a satisfactory functioning of the thermally fusible Safety Release Valve of the invention is the dead weight of the Safety Release Valve and the extent of lift that is available before the hole in the lid could be sealed. Here also, we have found that a predetermined extent of lift in the range of 1 to 3 mm is essential. Otherwise, a lesser extent of lift will seal the hole prior to air being completely expelled. If the lift is more than the predetermined range, either it takes a longer duration for sealing the hole when the pressure cooker is in operation, or the hole does not get sealed at all.

The above two factors (annular clearance and lift) are considered as critical factors.

Moreover, if the dead weight of the thermally fusible Safety Release Valve of the invention is too less the hole gets sealed earlier before all the air could be vented. If the dead weight is too much, either it takes a longer duration for sealing the hole or the hole does not get sealed at all. Dead weight which depends on "lift" and stem diameter, and annular clearance, etc. has to be adjusted in such a way that the rubber washer of the safety fuse retainer, seals the annular gap, in the approximate pressure range 0.1 to 0.8 psi.

It has been further observed that for a successful functioning of the Safety Release Valve of the invention, the central/longitudinal axis of the same should be inclined to the vertical axis of the cooker by an amount of angle $a$ ranging from 3° to 18° because when such an angle is maintained, the resultant force of the issuing steam takes the right time to bodily lift the valve when substantially all the air has been removed. At angles less than 3° to the vertical axis, the bodily lift is premature and at angles beyond 18° the bodily lift comes too late. It must be noted that this requirement is consequent to the lids of pressure cookers necessarily curved.

All the factors governing the design parameters of the proposed invention discussed above depend upon the partial pressures exerted by air and steam from the time of steam formation till the air is substantially removed and the safety valve seals the hole.

Having now described the invention what we claim as new is:

1. A novel, dual functioning, dual metal safety release valve for a pressure cooker comprises a fusible metal alloy material held within a bore of a metallic retainer member, a stem of said metallic retainer being loosely held by a holding member to an opening in a lid of the pressure cooker at an angle of 3° to 18° to a vertical axis of the cooker and the ratio of the diameter of the opening to the diameter of the stem being 1.05 to 1.20, the said stem also having a thin washer made of nonmetallic, resilient material and having a lift distance of 1 to 3 mm to seal the opening in the lid of the pressure cooker after substantially all the air and some steam are vented during operation of the cooker.

2. A novel, dual functioning, dual metal safety release valve, as claimed in claim 1, wherein the fusible metal alloy is made of conventional, low-temperature, fusible metal alloys.

3. A novel, dual functioning, dual metal safety release valve, as claimed in claim 2, wherein the fusible metal alloy is held in the form of a plug at the lower end of the bore in the metallic retainer.

4. A novel, dual functioning, dual metal safety release valve, as claimed in claim 1, wherein the holding member is engaged externally of the lid of the pressure cooker on a protruding upper portion of the stem of the metallic retainer.

5. A novel, dual functioning, dual metal safety release valve, as claimed in claim 4, wherein the holding member comprises a holding cross-pin engaged in a bore in a top portion of the stem.

6. A novel, dual functioning, dual metal safety release valve, as claimed in claim 1, wherein a lower body of the metallic retainer is provided with an under-cut portion adapted to provide a seat for said nonmetallic resilient washer.

7. A novel, dual functioning, dual metal safety release valve, as claimed in claim 6, wherein the stem of the retainer member has a taper at its lower external side, tapering towards the upper end.

8. A novel, dual functioning, dual metal safety release valve, as claimed in claim 2, wherein the resilient washer is made of nitrile rubber or other heat-resistant, elastic material.

* * * * *